Figure 1:
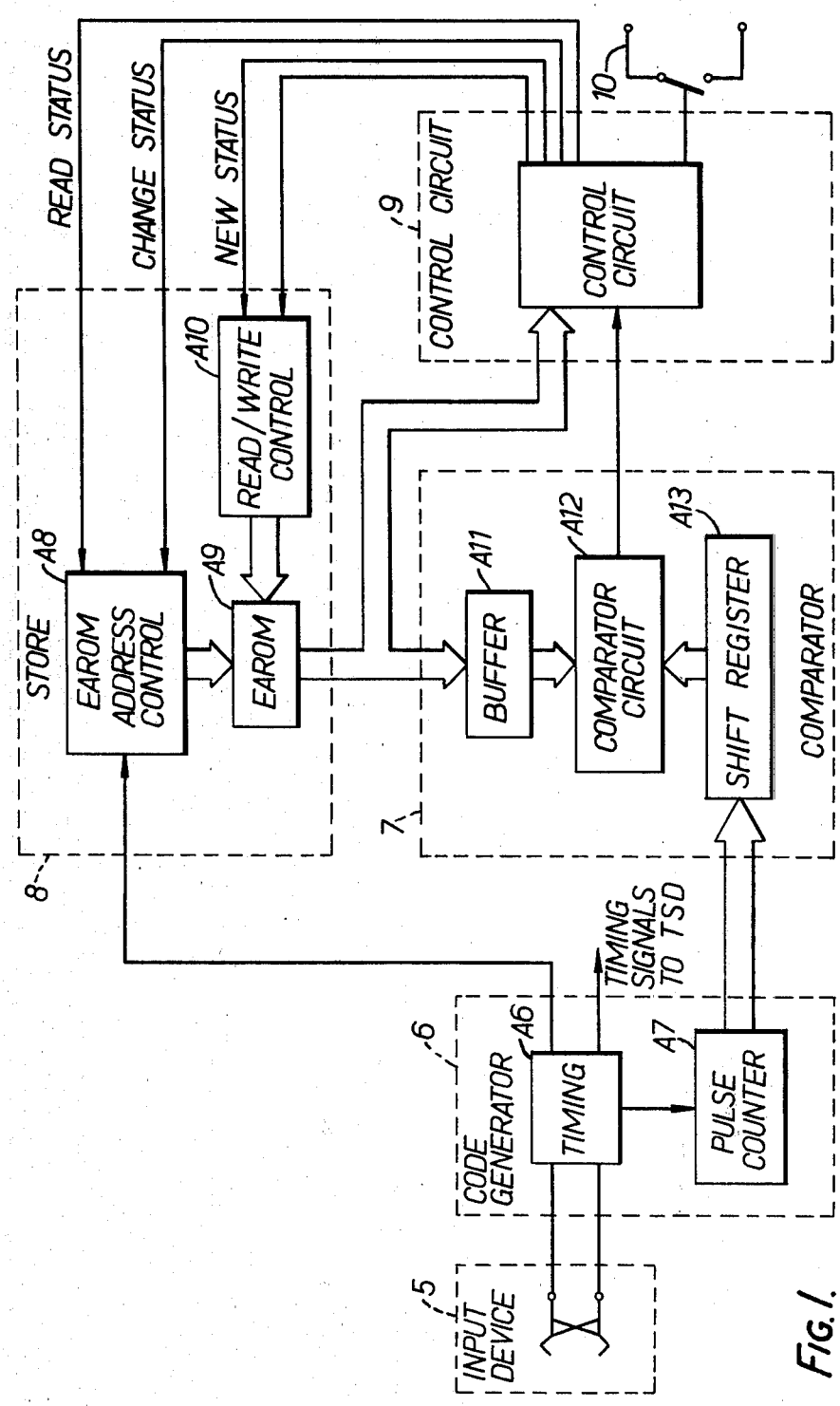

United States Patent [19]
Murray

[11] 4,358,640
[45] Nov. 9, 1982

[54] TELEPHONE SECURITY DEVICE

[76] Inventor: Leonard Q. Murray, 20 Holland Park, London W11, England

[21] Appl. No.: 210,319

[22] Filed: Nov. 25, 1980

[51] Int. Cl.³ .......................................... H04M 1/66
[52] U.S. Cl. ............................ 179/90 D; 179/18 DA
[58] Field of Search .......... 179/90 D, 18 DA, 189 D, 179/18 B; 364/706, 707, 708

[56] References Cited

U.S. PATENT DOCUMENTS

| | | | |
|---|---|---|---|
| 3,851,109 | 11/1974 | Downs et al. | 179/90 D |
| 3,872,260 | 3/1975 | Oatis | 179/90 D |
| 3,985,972 | 10/1976 | Rolin et al. | 179/18 DA |
| 4,046,965 | 9/1977 | Kontomerkos | 179/18 DA |
| 4,099,033 | 7/1978 | Murray | 179/90 D |
| 4,153,937 | 5/1979 | Poland | 364/706 |
| 4,188,508 | 2/1980 | Rogens et al. | 179/18 DA |

FOREIGN PATENT DOCUMENTS

| | | |
|---|---|---|
| 1127265 | 9/1968 | United Kingdom . |
| 1162484 | 8/1969 | United Kingdom . |
| 1182569 | 2/1970 | United Kingdom . |
| 1220958 | 1/1971 | United Kingdom . |
| 1360038 | 7/1974 | United Kingdom . |
| 1371120 | 10/1974 | United Kingdom . |
| 1371909 | 10/1974 | United Kingdom . |

OTHER PUBLICATIONS

"Data Traffic in PABX's", *International Switching Symposium Record*, Willret, 1972, published by IEEE.

Primary Examiner—Gerald L. Brigance
Attorney, Agent, or Firm—Armstrong, Nikaido, Marmelstein & Kubovcik

[57] ABSTRACT

A telephone security device has a code signal recognition means for storing two sets of variables, one of which governs the current operating mode of the system, and the other of which comprises first and second predetermined multiple-digit numerical code numbers responsive to proper inputs for producing first and second output signals, respectively. These output signals control a mode register means which has two stable states. In one state, the mode register means responds to the first output signals of the code signal recognition means to enter into its other state, thereby rendering the inhibiter means inoperative and allowing any number of outgoing calls to be made. The mode register means remains in this other state even following disconnection of a subsequently made call. However, the mode register means responds to the second output signal of the code signal recognition means to re-enter its one state, in which case the inhibiter means prevents the successful completion of certain calls as determined by the current operating mode of the system. The code signal recognition means includes an electrical alterable read-only memory ("EAROM") which may be continually reprogrammed without requiring a disassembly of the telephone set.

12 Claims, 3 Drawing Figures

TELEPHONE SECURITY DEVICE

This invention relates to telephone security devices.

The specification of my U.S. Pat. No. 4,099,033 discloses a telephone security device for preventing unauthorised use of a telephone instrument, the device comprising:

controllable inhibit means for preventing the successful setting up of a connection in response to operation of the called number selecting means of the instrument;

code signal recognition means which has an input for receiving code signals and which is operable for responding to the reception thereby of a code signal corresponding to a predetermined code signal to produce a corresponding mode output signal, and mode register means which has two stable mode states, which is connected to said code signal recognition means and said inhibit means, and which is operable when it is in one of said two states to respond to the reception from the code signal recognition means of said mode output signal to enter the other of said two states and to remain in the said other state even following disconnection of a subsequently made telephone call, the mode register means being further operable to control said inhibit means so that, for as long as the mode register means is in said one of said two states, the inhibit means prevents the successful setting up of a connection in response to operation of said called number selecting means to make outgoing calls to at least some destination telephone numbers and, for as long as the mode register means is in said other state, the inhibit means is inoperative and hence allows any number of outgoing calls to be made normally. Such a telephone security device will be referred to herein as "A telephone security device as defined."

According to the present invention there is provided a telephone security device as defined in which the code signal recognition means comprises, for storing a code signal to which the code signal recognition means is to respond and a signal representative of an operating mode into which the device has been set by a previously received code signal, an electrically alterable read-only memory.

The characteristics of such devices, known as EAROM devices, are such that data can be stored in the devices and will remain stored even if the energy supply to the memory is removed and then reapplied, typical data retention periods being of the order of tens of years. This data can, if required, be erased and new data stored by the application of the appropriate signals. The details of the EAROM devices are well known to those skilled in the art, and commercial devices currently available are easily able to offer the storage capacity required for both the code signals and the operating mode signals, and can be read repeatedly without affecting the stored contents. One application requiring similar characteristics where these devices are currently used is in programmable personal calculators.

Figure 2:
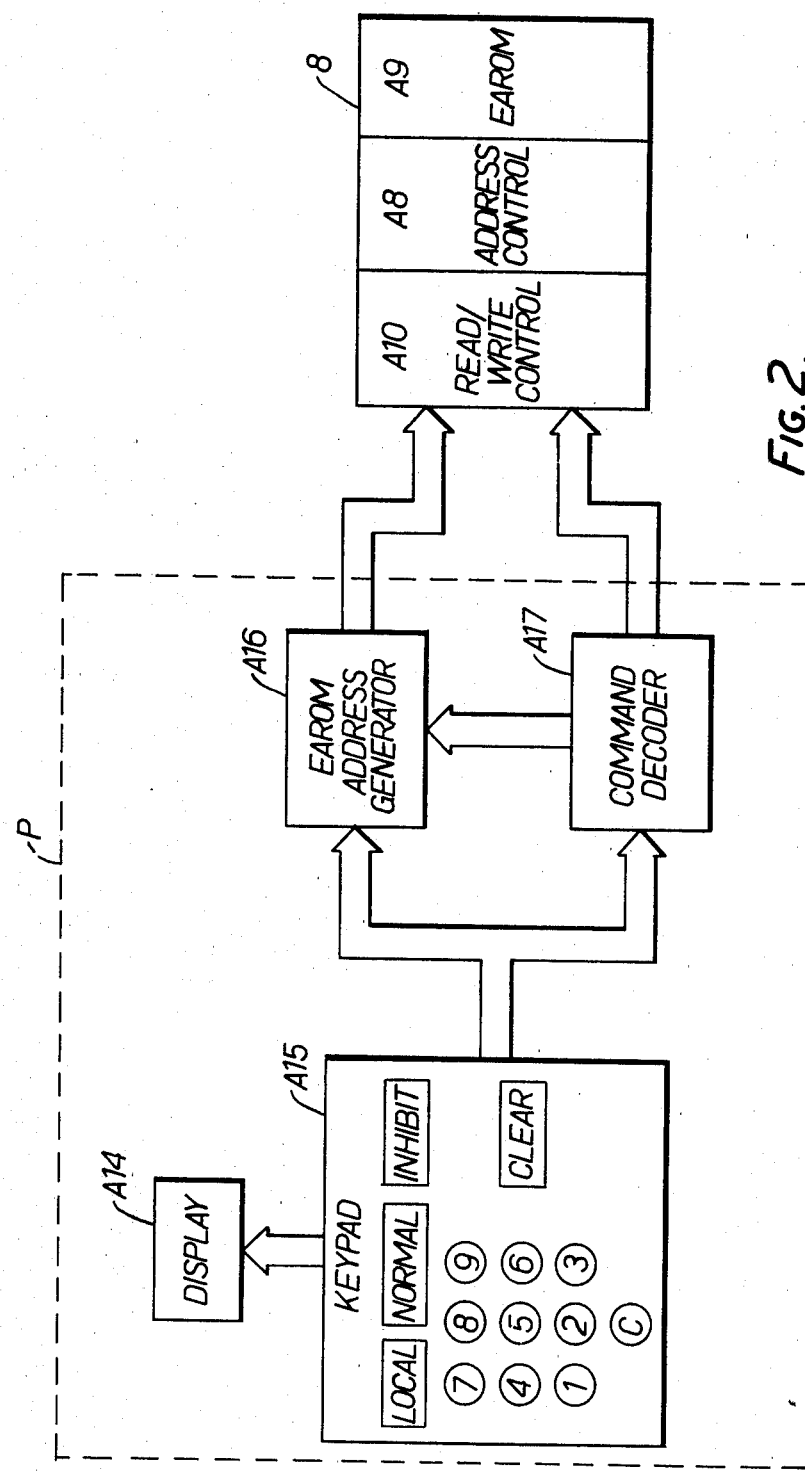
Figure 3:
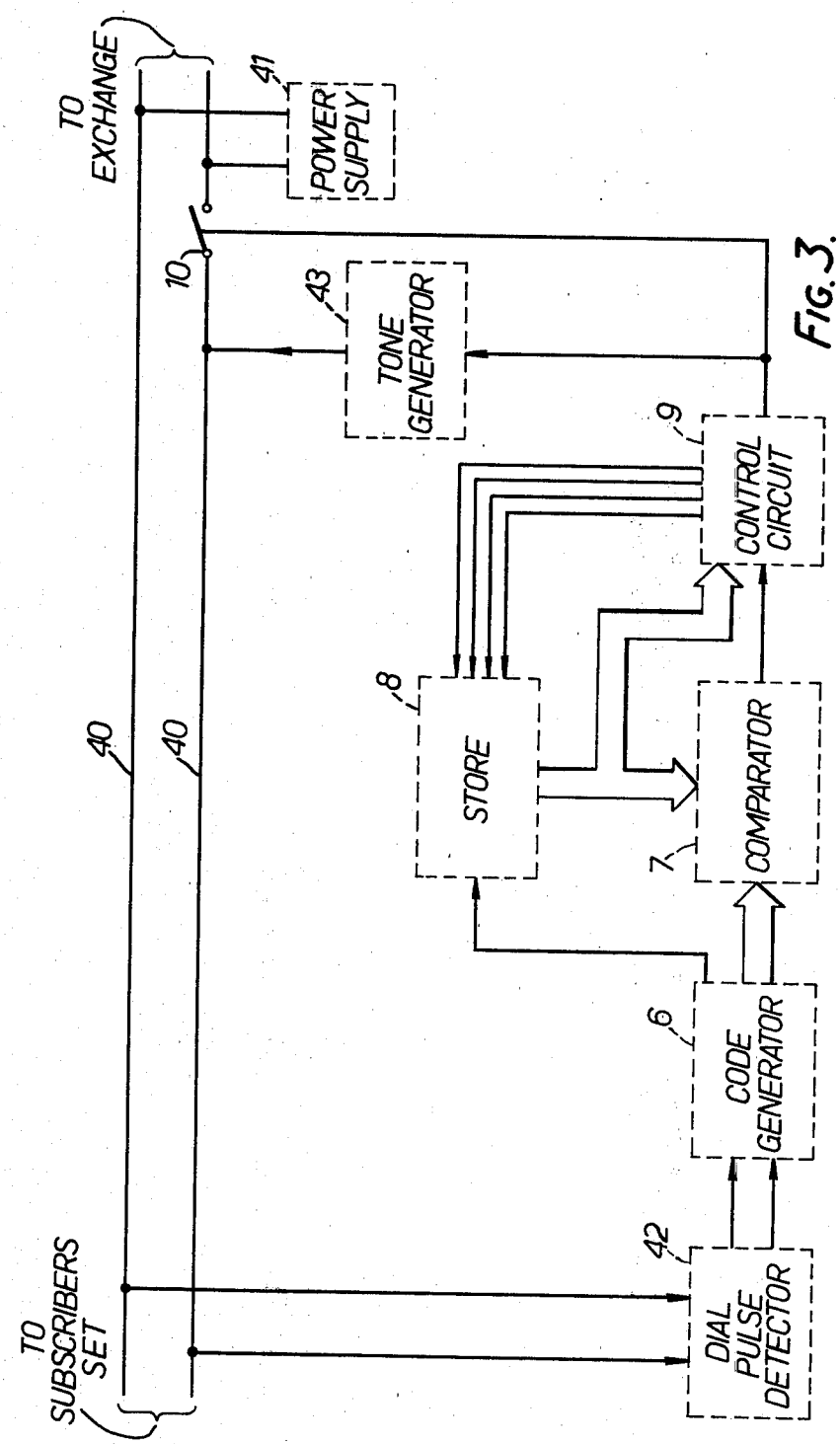

For a better understanding of the invention and to show how the same may be carried into effect, reference will now be made, by way of example, to the accompanying drawings, wherein:

FIG. 1 is a simplified circuit diagram of a first embodiment of telephone security device of the invention, connected to a telephone subscriber's set, FIG. 2 is a simplified circuit diagram of a programming device for the telephone security device, and FIG. 3 is a simplified circuit diagram of a second embodiment of telephone security device of the invention connected to the line between the subscriber's set and the exchange at a given point along the line.

FIG. 1 shows a modification of the telephone security device particularly described in the specification of U.S. Pat. No. 4,099,033. In the figure, the input device 5 may be the telephone dial contacts and these are connected to a code generator 6. The latter includes a timing circuit A6 and a pulse counter A7. The timing generator circuit A6 produces the necessary timing signals for the TSD. The pulse counter A7 counts the dialled impulses from the input device 5 to form a binary number representing the value of the last dialled digit and presents it to a shift register A13. The store 8 comprises a non-volatile memory and its various control circuits. The non-volatile memory is embodied in an electrically alterable read-only (EAROM) A9, having an address control A8 and a Read/Write Control A10. The EAROM A9 is configured in a suitable arrangement for storing the operating parameters, the address control A8 and Read/Write Control A10 providing the necessary signals to access the EAROM A9. The comparator 7 comprises a Buffer A11, a comparator circuit A12 and a shift register A13. The Buffer A11 holds the comparison code number supplied by the EAROM A9, the shift register A13 holds the dialled number and the comparator circuit compares these two numbers. The control circuit 9 uses the result of the comparison and the current operating mode information from the EAROM A9 to INHIBIT or to allow the call. The control circuit 9 also updates the operating mode held in the EAROM A9 when the comparator 7 indicates that this is necessary. The switch 10 INHIBITS or allows the call as instructed by the control circuit 9.

When an EAROM is used as the storage means in any particular embodiment, the subscriber will, via mode setting circuitry, only be able to alter the mode storage bits, i.e. the mode of the device. The mode codes would be set by removing the EAROM, which would be on a plug-in module and inserting it into an appropriate socket on a small programming device containing a simple circuit which would enable the mode codes to be altered to the required numbers. Such a programming device, an example of which is described hereinafter with reference to FIG. 2, could be the property of the Telephone Authority and would be in the possession of qualified personnel. This operation would require the dismantling of the telephone before the EAROM was removed for reprogramming and would thus normally be performed by qualified personnel. While this would not prevent the possibility of fraudulent alteration of the mode codes, such action would require specialist knowledge and equipment.

Many push-button and card-dialling type telephones operate on the principle that the digits of the number being dialled are first entered into and stored in the telephone, the appropriate dialling pulses or tones being generated either during or after entry of the number being dialled. The circuitry used to implement this function is normally in the form of an integrated circuit, (known colloquially as a dialling chip), and in at least one commercial form, has the capacity to store up to twenty digits before generating dial pulses or tones. Thus one use of my invention would be to include the principle thereof in the integrated circuit used to perform the dialling function. This would allow the comparator and control circuit to monitor the digits as they were being stored in the integrated circuit and the decision to INHIBIT the call could then be made before any dialling signals were sent to the exchange. This would have the benefit of preventing the exchange from being loaded by any dialling signals generated before the INHIBIT decision was made as is the case where the digits are monitored as they go to line. In this implementation the inhibition of the cell would consist, in the simplest case, of the dialling signals just not being generated.

The technical implementation of my invention in such an integrated circuit is relatively simple, its exact form being dependent upon the other functions implemented in the said integrated circuit. As a result this embodiment will not be described in any detail.

My invention requires that two sets of variables be stored and be easily readable in any integrated circuit implementing the principles of the invention, these variables being:

(1) The current operating mode of the device (Inhibit, Normal or Local).

(2) The mode setting code numbers to which the device is to respond.

(1) above will normally be altered by the authorised subscriber as part of the device's normal operation.

(2) above will generally only be altered by qualified personnel from the appropriate Telephone Authority using a programming device.

In the event that any other facility available to the subscriber requires the dialling of the subscriber's own number but it is required that the telephone does not enter the INHIBIT mode as a result, the INHIBIT code can be altered to any number that does not compromise an existing subscriber's number or an existing service number. One possibility would be to use one of the unused three-digit numbers reserved by the Telephone Authority.

The use of a three-digit code as the INHIBIT code instead of the subscriber's own number would have the advantage that when the device is embodied in a rotary dial type of selecting means only three sets of dial pulses would be sent to line before the INHIBIT decision and consequent disconnect condition occurred. (As previously stated, such INHIBIT code pulses would not be sent to line in a dialling chip type embodiment).

In any embodiment it would be advantageous for the device to generate, via the subscriber's earpiece, a number-unobtainable tone once the call had been inhibited, thus dissuading the unauthorised caller from continuing to attempt to obtain the number. This could easily be implmented by an oscillator circuit which is switched into the telephone circuit once the inhibiting relay is activated. Further details of how this feature could be implemented will be found in the description of FIG. 3 of the accompanying drawings.

Turning now to FIG. 2 a suitable programming device P for the store comprises a keypad A15, a display A14, an EAROM address generator A16 and a command decoder A17, and is shown connected to the store. The keypad A15 is used to preset the mode setting code numbers in the EAROM A9 of the store 8 via the EAROM address generator A16 and the EAROM address control A8. The mode setting code numbers are displayed by the display A14 as they are entered via the numeric portion of the keypad A15. When the complete number has been assembled, the appropriate mode button (i.e. LOCAL, NORMAL, INHIBIT) is selected. This is detected by the command decoder A17, which then causes the numbers to be loaded into the EAROM A9 via the EAROM address generator A16 and EAROM address control A8. All three mode setting code numbers are selected in this manner.

The method of programming the TSD store could either be:

(a) by removing the store module and inserting it into an appropriate socket in the programming device, or (b) by taking the output from the programming device via a lead and plug and plugging the lead into an appropriate socket situated in the telephone security device.

The telephone security device shown in FIG. 3 is intended for connection to the line between the subscriber's set and the exchange at any point along that line. For convenience, it will usually be sited adjacent the subscriber's set or it will form part of the subscriber's set. The embodiment is suitable for use with telephones comprising any sort of impulse dialling mechanism, e.g. rotary dial mechanisms, push-button and card dialling mechanisms, and by making minor changes to the interface circuits between the line and the device, it may be adapted for tone dialling systems.

The main difference between this embodiment and my original rotary dial embodiment is that it is connected in parallel to rather than in series with the telephone line. This removes the need for the device to generate dialling pulses. Calls are inhibited and cleared, as before, by the disconnect relay 10.

Referring to FIG. 3, the embodiment comprises a power supply 41 which extracts power from the telephone lines 40 during the line breaks generated in dialling. During the periods in which the lines 40 are short-circuited by the dial switch, the circuit is maintained in an active state by the charge stored on a capacitor in the power supply. This capacitor is recharged each time a line-break occurs.

Other possible methods of extracting power from the telephone lines are available. One method has the power supply placed in series with the telephone line so that power is continually extracted from the telephone line (although at a sufficiently low level so as not to overload the exchange or interfere with the normal operation of the telephone system). Where voltages exceeding those directly available from the telephone lines are required (as they often are for many low-power metal oxide semiconductor integrated circuits from which the telephone security device may be implemented) a D.C.-D.C. converter can be used. Both power supply methods could be used. The latter method has the advantage that power is continuously available.

Since this embodiment is connected in parallel to rather than in series with the telephone line, a dial pulse detector circuit 42 is included. This circuit differentiates between dial pulses and other signals carried by the line. Any dial pulses detected are presented to the code generator 6 in a form similar to that generated by the dial contacts. If this embodiment were to be used in a tone dialling system then the dial pulse detector 42 would be modified to extract the dialling information from the dialling tones.

Whatever the power supply or dial pulse extraction methods the circuit operation is identical to that described and illustrated with reference to FIG. 1 above once the dial pulse information has been made available to the code generator 6.

Unlike the embodiment of U.S. Pat. No. 4,099,033, the present embodiment does not need to generate dial pulses so no dialling circuit is included. A tone generator 43 is included. This circuit, activated by the signal to the disconnect relay 10, generates a signal of the same frequency as that used to generate the unobtainable-number tone at the exchange. This warns the subscriber that the circuit has been activated, (if necessary, to uniquely identify the operation of the circuit a different frequency from the unobtainable-number tone can be used).

The device of U.S. Pat. No. 4,099,033, together with the developments and additional features thereof disclosed herein, may be embodied as software or hardware in a suitably programmed computer, for example in the computer which is used in a stored program control (SPC) electronic telephone exchange. In a normal system comprising such an exchange, the dialling pulses or signals formed at the subscriber's set are received by a computer which then acts, in accordance with its stored program, to make the desired connection. To embody the present invention in such a system, the computer is programmed to receive the dialling pulses or signals and then to make the desired connection only if the call is not one which is prohibited having regard to the mode, i.e. the aforementioned NORMAL, LOCAL or INHIBIT modes which has been registered by the computer in respect of the relevant subscriber's set.

I claim:

1. A telephone security device for preventing unauthorized use of a telephone instrument, the device comprising:

inhibit means for connection to a called number selecting means of the subscriber's set for at least partly inhibiting the operating of said selecting means;

code signal recognition means which has an input for receiving code signals and which is operable for responding to the reception thereby of first and second predetermined multiple digit numerical code signals to produce corresponding first and second mode output signals, and mode register means which has two stable mode states, which is connected to said code signal recognition means and said inhibit means, and which is operable when it is in one of said two states to respond to the reception from the code signal recognition means of said first mode output signal to enter the other of said two states and to remain in the said other state even following disconnection of a subsequently made telephone call and when it is in said other state to respond to the reception of the second mode output signal from the code signal recognition means to enter said one state, the mode register means being further operable to control said inhibit means so that, for as long as the mode register means is in said one of said two states, the inhibit means prevents any successful attempt to use the said called number selecting means to make outgoing calls to at least some destination telephone numbers and, for as long as the mode register means is in said other state, the inhibit means is inoperative and hence allows any number of outgoing calls to be made normally, in which the code signal recognition means comprises an electrically alterable read-only memory arranged to store the first and second predetermined multiple digit numerical code signals to which the code signal recognition means is to respond and a signal representative of an operating mode into which the device has been set by a previously received code signal.

2. A device as set forth in claim 1 further including a comparator for comparing the code signal stored in the electrically alterable read-only memory with the code signals received by the register means, and control means which are arranged to be operated by the comparator for controlling the inhibit means and for altering the mode signal stored in the electrically alterable read-only memory.

3. A device as set forth in claim 1, in which there is provided connector means which is coupled to the code signal recognition means and is operable for enabling digital signal forming means to be connected to the code signal recognition means for setting the code signal to which the code signal recognition means responds.

4. A device as set forth in claim 3, further comprising a connector member, such as a socket, which is connected to the code signal recognition means and is able to receive a co-acting connector member, such as a plug, connected to the digital signal forming means.

5. A device as set forth in claim 3, in which the code signal recognition means is formed as a module connected to the other parts of the device by way of two coacting connector members, such as a plug and socket, whereby the storage module may be removed from the device and connected, by way of the connecting members, to the digital signal forming means.

6. A device as set forth in claim 3, in which the digital signal forming means comprises a keypad.

7. A device as set forth in claim 1 and as incorporated in an electronic digital computer which embodies said inhibit means and said signal recognition means by being programmed to prevent the successful setting up of a connection in response to operation of the selecting means by not completing a connection to numbers which may be dialled unless the computer has received previously a predetermined code signal.

8. A device as set forth in claim 7, in which the computer is operable to register for a subscriber's set connected thereto one of two stable modes determined by code signals applied to the computer by way of the subscriber's set, for one of which modes the computer is operable to inhibit the calling of destination telephone numbers from that subscriber's set and for the other of which the computer does not inhibit calling of any numbers.

9. A device as set forth in claim 7, in which the computer is operable to register for said subscriber's set one of three stable modes, for one of which the computer is operable to inhibit the calling of all but at least one predetermined destination number such as an emergency service number, for a second of which the computer is operable to inhibit trunk and international calls, and for the third of which the computer does not inhibit such calls.

10. A device as set forth in claim 1 and as incorporated in a stored programme control electronic computerized telephone exchange which is programmed to prevent unauthorized use of a telephone subscriber's set connected to it by preventing the successful setting up of a connection in response to operation of the called number selecting means of the subscriber's set by not completing a connection to at least some numbers which may be dialed and which is operable for responding to said second predetermined multiple digit numerical code signal to cease such prevention.

11. In a telephone security system, the combination of a code signal recognition means including memory means for storing two sets of variables, the first set of variables comprising the current operating mode of the system and being normally selected by the telephone subscriber from the group consisting of at least NORMAL and INHIBIT, and the second set of variables comprising first and second predetermined multiple-digit numerical code numbers to which the code signal recognition means is to respond, said code numbers being normally altered only by authorized telephone personnel, the memory storing means being continuously reprogrammable without requiring a disassembly of the telephone set, said code signal recognition means responding to the input of said first and second predetermined multiple-digit numerical code numbers for producing first and second mode output signals, respectively, mode register means connected to the output of the code signal recognition means and having two stable states, whereby in one state the mode register means responds to the first mode output signal of the code signal recognition means to enter into its other state, said mode register means thereafter remaining in said other state even following disconnection of a subsequently made call, but responding to the second mode output signal of the code signal recognition means to re-enter said one state, and inhibit means connected to the output of the mode register means, whereby whenever the mode register means is in said one state corresponding to the INHIBIT operating mode of the system, the inhibit means prevents the successful completion of certain calls, and whereby whenever the mode register means is in said other state corresponding to the NORMAL operating mode of the system, the inhibit means is inoperable, thereby allowing any number of outgoing calls to be made.

12. The combination of claim 11, wherein the memory storing means comprises an electrically-alterable read only memory.

* * * * *